US011845412B2

(12) United States Patent
Choi (10) Patent No.: US 11,845,412 B2
(45) Date of Patent: Dec. 19, 2023

(54) ELECTROMAGNETIC BRAKE SYSTEM (71) Applicant: DOOSAN INDUSTRIAL VEHICLE CO., LTD, Incheon (KR)

(72) Inventor: Jin Woo Choi, Incheon (KR)

(73) Assignee: DOOSAN INDUSTRIAL VEHICLE CO., LTD., Incheon (KR)

(*) Notice: Subject to any disclaimer, the term of this patent is extended or adjusted under 35 U.S.C. 154(b) by 113 days.

(21) Appl. No.: 17/475,352

(22) Filed: Sep. 15, 2021

(65) Prior Publication Data
US 2022/0080938 A1 Mar. 17, 2022

(30) Foreign Application Priority Data

Sep. 15, 2020 (KR) .......... 10-2020-0118507

(51) Int. Cl.
F16D 65/12 (2006.01)
B60T 13/74 (2006.01)
(Continued)

(52) U.S. Cl.
CPC ............ *B60T 13/743* (2013.01); *B60T 1/065* (2013.01); *F16D 55/02* (2013.01); *F16D 65/005* (2013.01);
(Continued)

(58) Field of Classification Search
CPC ........ B60T 13/743; B60T 1/065; F16D 55/02; F16D 65/005; F16D 65/092; F16D 65/123; F16D 2065/132; F16D 2121/22
(Continued)

(56) References Cited

U.S. PATENT DOCUMENTS 4,445,596 A * 5/1984 Waters .................... F16D 55/28
192/109 B
5,154,261 A * 10/1992 Tanaka .................... B66D 5/30
188/161
(Continued)

FOREIGN PATENT DOCUMENTS

DE 85 19 223 10/1985
DE 10 2011 107408 1/2013
(Continued)

OTHER PUBLICATIONS

Office Action dated Oct. 5, 2021 for Korean Patent Application No. 10-2020-0118507 and its English translation by Google Translate.
(Continued)

*Primary Examiner* — Christopher P Schwartz
(74) *Attorney, Agent, or Firm* — Ladas & Parry, LLP (57) ABSTRACT Disclosed herein is an electromagnetic brake system. The electromagnetic brake system includes a brake disc configured to be rotated together with a drive shaft of a drive motor configured to operate a vehicle wheel, an armature disc configured to be movable so as to be in close contact with or so as to be separated from one side of the brake disc, an elastic member configured to elastically press the armature disc to the one side of the brake disc to a direction in which the armature disc is in close contact with the brake disc, and an inductor configured to separate the armature disc from the brake disc by an electrical signal. The brake disc includes a tube portion mounted on the drive shaft, and a plate portion provided to extend in an outward direction of the tube portion to be opposite to the armature disc. The tube portion and the plate portion are provided as a single member in which the tube portion and the plate portion are integrally formed with each other.

13 Claims, 7 Drawing Sheets (51) Int. Cl.
  *B60T 1/06* (2006.01)
  *F16D 55/02* (2006.01)
  *F16D 65/00* (2006.01)
  *F16D 65/092* (2006.01)
  *F16D 65/02* (2006.01)
  *F16D 121/22* (2012.01)

(52) U.S. Cl.
  CPC ......... *F16D 65/092* (2013.01); *F16D 65/123* (2013.01); *F16D 2065/132* (2013.01); *F16D 2121/22* (2013.01)

(58) Field of Classification Search
  USPC .......................................... 188/156–164, 171
  See application file for complete search history.

(56) References Cited

U.S. PATENT DOCUMENTS

| 6,182,803 | B1 * | 2/2001 | Hirai | F16D 55/02 |
| | | | | 188/161 |
| 6,237,730 | B1 * | 5/2001 | Dropmann | F16D 55/28 |
| | | | | 188/163 |
| 6,536,563 | B1 * | 3/2003 | Schlehbusch | F16D 65/46 |
| | | | | 188/164 |
| 11,378,145 | B2 * | 7/2022 | Bardon | F16D 55/28 |
| 2020/0198612 | A1 * | 6/2020 | Yi | B60T 7/045 |

FOREIGN PATENT DOCUMENTS

| DE | 10 2015 214018 | 1/2017 |
| EP | 3 042 815 | 7/2016 |
| JP | 60-177340 | 11/1985 |
| JP | 2003-156089 | 5/2003 |
| JP | 2004-270759 | 9/2004 |
| JP | 2013-5562 | 1/2013 |
| KR | 10-2020-0013544 | 2/2020 |

OTHER PUBLICATIONS

Extended European Search Report dated Feb. 10, 2022 for European Patent Application No. 21196687.4.

* cited by examiner

ELECTROMAGNETIC BRAKE SYSTEM

CROSS-REFERENCE TO RELATED APPLICATION(S)

This application is based on and claims priority under 35 U.S.C. § 119 to Korean Patent Application No. 10-2020-0118507, filed on Sep. 15, 2020, in the Korean Intellectual Property Office, the disclosure of which is incorporated by reference herein in its entirety

BACKGROUND

1. Field

The disclosure relates to an electromagnetic brake system, and more particularly, to an electromagnetic brake system capable of controlling braking of a vehicle by using an electrical signal.

2. Description of Related Art

A brake system for implementing a brake action is essential to various vehicles that transport passengers or cargo or that perform specific functions, and thus various types of brake systems have been proposed for the safety of drivers and cargo.

Conventionally, a hydraulic brake system that forms hydraulic pressure using a pressurized medium, such as brake oil and delivers the hydraulic pressure to a vehicle wheel to brake a vehicle has been mainly applied. Recently, brake systems, which have various structures and methods depending on an operation purpose or driving environment of the vehicle, have been introduced to the market.

Meanwhile, as awareness of environmental pollution has become more important in recent years, electric vehicles have been popular and the electric vehicles operate a drive motor for driving by receiving power from a rechargeable battery and use the power provided from the drive motor as a vehicle power source. The electrification has been widely applied to various types of vehicles that perform specific purposes, such as vehicles for various construction machines and forklifts, as well as passenger vehicles that transport passengers.

Electric forklifts require smooth steering and maneuverability to perform quick and accurate work within a narrow working space. Therefore, electric forklifts equipped with drive motors for driving vehicle wheels independently of left and right wheels have been developed. In general, electric forklifts performs a brake action by limiting a rotation speed of the drive motor by controlling a magnitude or pulse of a current applied to the drive motor, and this type of brake actions is used as service brake to control a speed of the vehicle while driving. However, there is a risk of safety accidents due to an insufficient braking force to implement a brake action for parking of the forklift, that is, parking brake.

Therefore, a technology for improving the assembly and mountability of the product while stably implementing the service brake and the parking brake of the electric vehicle such as an electric forklift is required.

RELATED ART DOCUMENT

[Patent Document 1] Korea Patent Laid-Open Publication No. 10-2020-0013544 (2020.02.07.)

SUMMARY

Therefore, it is an aspect of the disclosure to provide an electromagnetic brake system capable of improving assembly and productivity of a product with a simple structure It is another aspect of the disclosure to provide an electromagnetic brake system capable of improving mountability and securing space utilization of a vehicle by reducing the number of components and the size of a product.

It is another aspect of the disclosure to provide an electromagnetic brake system capable of improving durability by effectively preventing abrasion and separation between components by simplifying a structure.

It is another aspect of the disclosure to provide an electromagnetic brake system capable of improving operational reliability by effectively preventing noise and vibration between components by simplifying a structure.

It is another aspect of the disclosure to provide an electromagnetic brake system capable of reducing a manufacturing cost of a product by simplifying a structure.

It is another aspect of the disclosure to provide an electromagnetic brake system capable of stably implementing parking brake for various vehicles such as a forklift.

Additional aspects of the disclosure will be set forth in part in the description which follows and, in part, will be obvious from the description, or may be learned by practice of the disclosure.

In accordance with an aspect of the disclosure, an electromagnetic brake system includes a brake disc configured to be rotated together with a drive shaft of a drive motor configured to operate a vehicle wheel, an armature disc configured to be movable so as to be in close contact with or so as to be separated from one side of the brake disc, an elastic member configured to elastically press the armature disc to the one side of the brake disc to a direction in which the armature disc is in close contact with the brake disc, and an inductor configured to separate the armature disc from the brake disc by an electrical signal. The brake disc includes a tube portion mounted on the drive shaft, and a plate portion provided to extend in an outward direction of the tube portion to be opposite to the armature disc. The tube portion and the plate portion are provided as a single member in which the tube portion and the plate portion are integrally formed with each other.

The other side of the brake disc may be directly opposite to an outward surface of the drive motor.

The electromagnetic brake system may further include a spacer provided to maintain a gap between the outward surface of the drive motor and an inward surface of the inductor.

The spacer may be interposed between the outward surface of the drive motor and the inward surface of the inductor and provided to pass through the armature disc.

The spacer may be provided in such a way that a plurality of spacers is arranged at equal intervals from each other.

The electromagnetic brake system may further include a fastening member provided to mount the spacer to the inductor.

The tube portion may be provided in a hollow ring shape to allow the drive shaft to be seated therein, and an outer circumferential surface of the drive shaft may be spline-coupled to an inner circumferential surface of the tube portion.

The inductor may be provided with a receiving portion in which the drive shaft and the tube portion are received.

The armature disc may be provided with a through hole formed to pass through the armature disc in an axial direction to avow the drive shaft and the tube portion to be received therein.

The armature disc may be provided in the shape of a disc and configured to be movable in the axial direction along the outer circumferential surface of the tube portion.

In response to that the armature disc is in close contact with the one side of the brake disc by the elastic member or in response to braking a vehicle, the other side of the brake disc may be in close contact with the outward surface of the drive motor.

A receiving groove in a concave shape may be provided on the inward surface of the inductor, and the elastic member may be provided in such a way that at least one portion of the elastic member is inserted into the receiving groove.

The armature disc may include a guide protrusion provided to protrude along the axial direction and insertable into the receiving groove.

The brake disc may include a first lining provided on the other side of the plate portion, and a second lining provided on one side of the plate portion and an outer circumferential surface of the tube portion.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Hereinafter embodiments of the disclosure will be described in detail with reference to the accompanying drawings. The embodiments are provided so that this disclosure will be thorough and complete, and will fully convey the scope of the disclosure to those skilled in the art. Parts which are not associated with the description are omitted in order to specifically describe the embodiments, and the size and thickness of each component may be enlarged for clear description.

Figure 1:
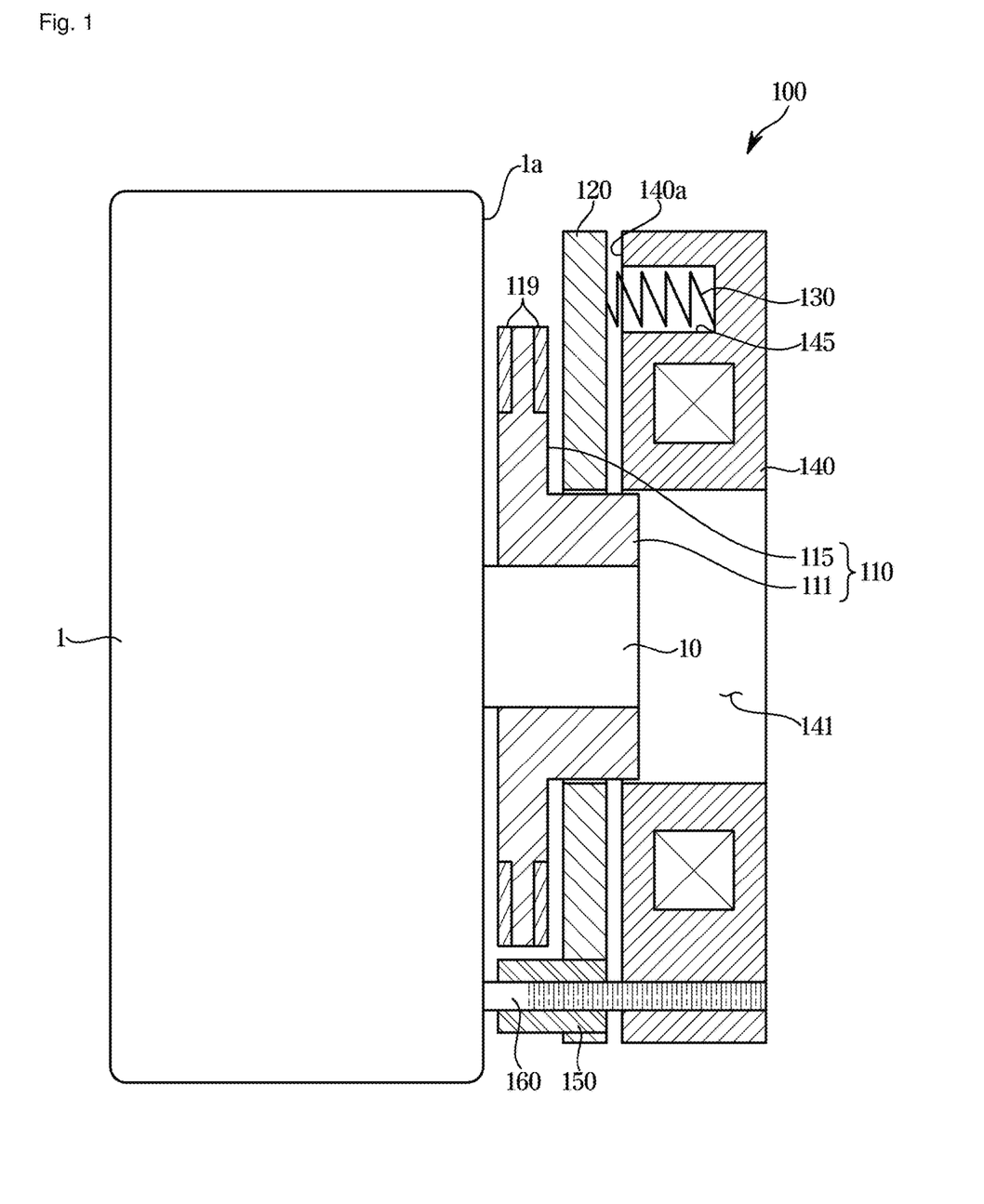
FIG. 1 is a longitudinal sectional view illustrating an electromagnetic brake system according to a first embodiment of the disclosure.
Figure 2:
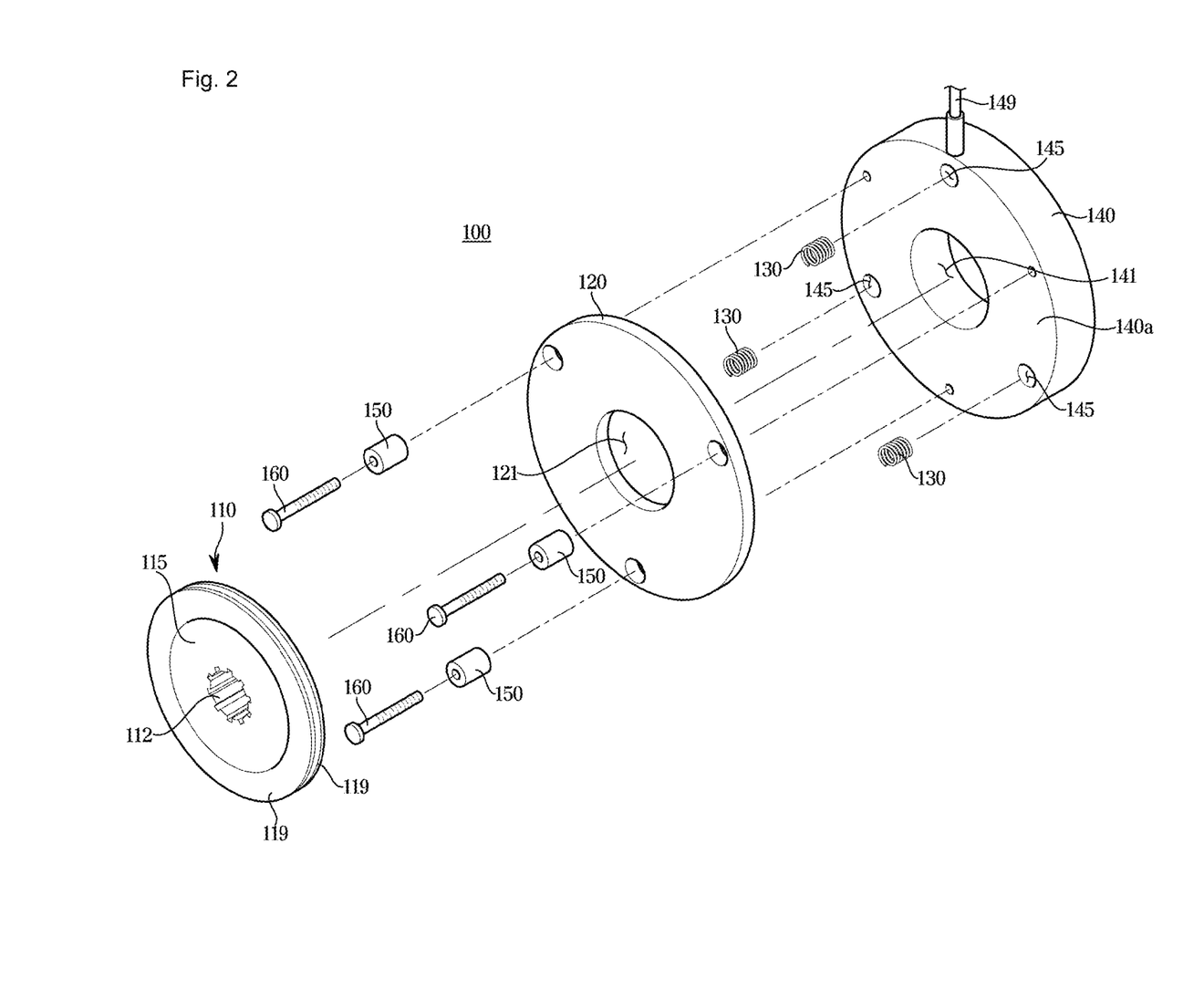
FIG. 2 is an exploded perspective view illustrating the electromagnetic brake system according to the first embodiment of the disclosure.
Figure 3:
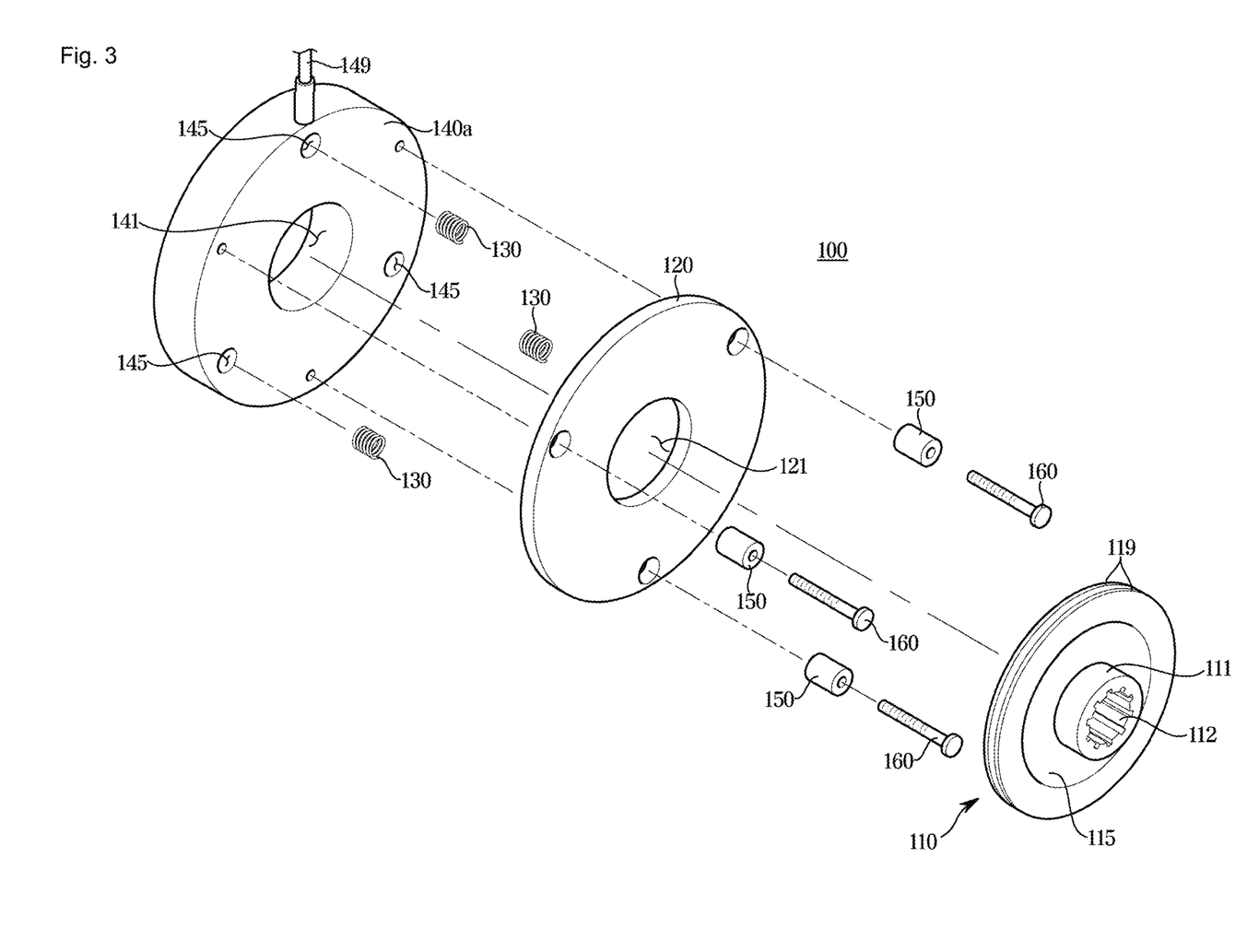
FIG. 3 is an exploded perspective view illustrating the electromagnetic brake system according to the first embodiment of the disclosure when viewed from another direction.

FIG. 1 is a longitudinal sectional view illustrating an electromagnetic brake system 100 according to a first embodiment of the disclosure, and FIGS. 2 and 3 are exploded perspective views illustrating the electromagnetic brake system 100 according to the first embodiment of the disclosure when viewed from different directions.

A drive motor 1 will be briefly described. The drive motor 1 may be connected to a vehicle wheel (not shown) of a vehicle, such as an electric forklift, to generate and provide a driving force for operating the vehicle wheel. The drive motor 1 may be operated by receiving power from a power supply (not shown), such as a battery, installed on the vehicle, and may output a rotational force of a drive shaft 10. The drive shaft 10 is connected to the vehicle wheel to be integrally rotated with the vehicle wheel so as to allow the vehicle to drive. The drive shaft 10 of the drive motor 1 may be exposed on an outward surface 1a (a right side with respect to FIG. 1) of the drive motor to allow electromagnetic brake systems 100, 200, and 300 according to embodiments to be described later to mechanically connected and mounted thereto.

Further, although not shown in the drawings, a stator fixedly installed and a rotor connected to be rotated together with the drive shaft 10 may be disposed inside the drive motor 1. However, this is merely an example for understanding of the disclosure, and thus it should be understood that a structure and an operation method may vary as long as a structure and an operation method is capable of driving of wheels using electricity as a power source, and capable of braking a vehicle such as parking brake by the electromagnetic brake systems 100, 200, and 300 according to embodiments.

Referring to FIGS. 1 to 3, the electromagnetic brake system 100 according to the first embodiment of the disclosure includes a brake disc 110 rotatable with the drive shaft 10 of the drive motor 1 configured to operate the vehicle wheel, an armature disc 120 movable in an axial direction to be in close contact with or spaced apart from the brake disc 110, an elastic member 130 configured to elastically press the armature disc 120 to a direction in which the armature disc 120 is in close contact with the brake disc 110, an inductor 140 configured to separate the armature disc 120 from the brake disc 110 by an electrical signal, a spacer 150 provided to generate and maintain a gap between the drive motor 1 and the inductor 140, and a fastening member 160 provided to mount the spacer 150 to the inductor 140.

The brake disc 110 may be provided to be connected and mounted to the drive shaft 10 of the drive motor 1 so as to be rotatable with the drive shaft 10, and the brake disc 110 may be configured to brake a vehicle or to release braking the vehicle by being in contact with or being separated from the armature disc 120.

The brake disc 110 includes a tube portion 111 installed around the drive shaft 10 of the drive motor 1, and a plate portion 115 provided to extend in an outward direction of the tube portion 111 to be in contact with the armature disc 120 to be described later. The brake disc 110 may be provided as a single member or a single component element because the tube portion 111 and the plate portion 115 are integrally formed with each other.

The tube portion 111 may be provided in a hollow ring shape to allow the drive shaft 10 to inserted and seated therein, and a spline 112 including a plurality of grooves formed along the axial direction may be formed on an inner circumferential surface of the tube portion 111. In accordance with the spline 112, a spline (not shown) may be formed along the axial direction on an outer circumferential surface of the drive shaft 10 coupled to the inner circumferential surface of the tube portion 111. Accordingly, the drive shaft 10 and the tube portion 111 are engaged with each other through the spline, and thus the drive shaft 10 may be rotated together with the brake disc 110.

The plate portion 115 may be provided in the shape of a disc by extending or expanding from the tube portion 111 in an outer diameter direction. One side (a right side with respect to FIG. 1) of the plate portion 115 may be provided to be opposite to the other side (a left side with respect to FIG. 1) of the armature disc 120 to be described later, and thus in response to that the one side of the plate portion 115 is in close contact with the other side of the armature disc 120, a brake action may be performed and in response to that the one side of the plate portion 115 is separated from the other side of the armature disc 120, the brake action may be released. The other side (a left side with respect to FIG. 1) of the plate portion 115 may be directly opposite to the outward surface 1a of the drive motor 1. In other words, it is not that the other side of the plate portion 115 is opposite to the outward surface 1a of the drive motor 1 by using an additional member, but the other side of the plate portion 115 may be directly opposite to the outward surface 1a of the drive motor 1 without an additional member. Therefore, it is possible to simplify the structure of the product and reduce a manufacturing cost. Further, as upon braking the vehicle, the other side of the plate portion 115 is in close contact with the outward surface 1a of the drive motor 1 as needed and thus opposite sides of the plate portion 115 are in frictional contact with the other side of the armature disc 120 and the outward surface 1a of the drive motor 1, it is possible to more stably implement the braking of vehicle.

The brake disc 110 may be formed of a non-magnetic material so as not to be affected even when an electrical signal, such as a current, is applied to the inductor 140 to be described later. In addition, a lining 119 formed of a rubber may be disposed on one side and the other side of the plate portion 115 to reduce abrasion of components and prevent noise, which is generated when the plate portion 115 is in contact with the armature disc 120 or the drive motor 1.

The brake disc 110 may be provided as a single member or a single component and coupled to the drive shaft 10. In other words, the brake disc 110 is provided as a single member in which the tube portion 111 coupled to the drive shaft 10 is integrally formed with the plate portion 115 that is in close contact with the armature disc 120 and performs frictional contact. Accordingly, the structure thereof is simplified and thus it is possible to improve the assembly and productivity of the product, and it is possible to reduce the manufacturing cost and to facilitate the maintenance during operation of the product. Further, it is possible to prevent load, noise and vibration, which are generated in a connection portion or a contact portion between components, and thus it is possible to secure the durability and operational reliability of the product.

The armature disc 120 may be configured to be movable along the axial direction by the elastic member 130 and the inductor 140 to be described later, and thus the armature disc 120 may be in close contact with or spaced from one side of the brake disc 110.

The armature disc 120 is provided in the shape of a disc, and a through hole 121, which is formed in the axial direction to allow the drive shaft 10 and the tube portion 111 to be inserted and received, may be provided in an inner central portion of the armature disc 120. In addition, a plurality of holes, through which the spacer 150 and the fastening member 160 to be described later pass, may be formed at equal intervals on an outer diameter side of the through hole 121. As an inner circumferential surface 121 of the through hole 121 is arranged to be opposite to an outer circumferential surface of the tube portion 111, an axial movement of the armature disc 120 may be guided.

The armature disc 120 may be elastically supported in a direction, in which the armature disc 120 is in close contact with one side of the plate portion 115 of the brake disc 110, by the elastic member 130 to be described later. In response to that an electrical signal, such as a current, is not applied to the inductor 140 to be described later, the armature disc 120 may be moved forward (a left direction with respect to FIG. 1) by the elastic member 130 so as to be in close contact with and in frictional contact with the plate portion 115 of the brake disc 110, thereby preventing a rotation of the brake disc 110 and the drive shaft 10 coupled to the brake disc 110, and thus it is possible to perform braking the vehicle. For this, the one side (the right side with respect to FIG. 1) of the armature disc 120 may be in contact with and be supported by the elastic member 130, and the other side (the left side with respect to FIG. 1) of the armature disc 120 may be arranged to be opposite to the one side (the right side with respect to FIG. 1) of the plate portion 115 of the brake disc 110.

In response to that the electrical signal, such as a current, is applied to the inductor 140 to be described later, the armature disc 120 may be moved backward (a right direction with respect to FIG. 1) and spaced from the plate portion 115 of the brake disc 110, and for this, the armature disc 120 may be formed of a magnetic material that may generate a displacement by receiving an electromagnetic force. An operation in which the armature disc 120 is moved backward by the electrical signal of the inductor 140 to release braking of vehicle, will be described later.

The elastic member 130 is provided to elastically press the armature disc 120 to a direction in which the armature disc 120 is in close contact with the one side of the plate portion 115 of the brake disc 110. A plurality of elastic members 130 may be arranged at equal intervals to each other so as to elastically and uniformly support the entire region of the armature disc 120. The elastic member 130 may be installed in the inductor 140 in such a way that at least one portion of the elastic member 130 is inserted and received in a receiving groove 145 recessed in the axial direction on an inward surface 140a (a left side with respect to FIG. 1) of the inductor 140 to be described later. One end of the elastic member 130 may be in contact with and supported by an inner surface of the receiving groove 145, and the other end of the elastic member 130 may be in contact with and supported by the one side (the right side with respect to FIG. 1) of the armature disc 120. In response to that the elastic member 130 elastically presses the armature disc 120 to move the armature disc 120 forward by an expansion restoring force in a state in which the electrical signal, such as a current, is not applied to the inductor 140 to be described later, the armature disc 120 may be in close contact with and in frictional contact with the brake disc 110, thereby braking the vehicle. However, because an elastic restoring force that the elastic member 130 presses the armature disc 120 in the forward direction is less than an attractive force that the inductor 140 to be described later moves the armature disc 120 backward, the elastic member 130 may be compressed during the inductor 140 is operated.

As illustrated in the drawings, the elastic member 130 may be formed of a coil spring to elastically support the armature disc 120. However, the structure is not limited thereto, and the structure and the material may vary, such as a rubber or synthetic resin, as long as a structure and a material are formed of a non-magnetic material that is not affected by the electrical signal of the inductor 140 to be described later, while elastically pressing the armature disc 120 in a direction the armature disc 120 is in close contact with the brake disc 110.

The inductor 140 is configured to separate the armature disc 120 from the brake disc 110 by an electrical signal such as a current.

As for the inductor 140, a receiving hole 141, in which the drive shaft 10 and the tube portion 111 of the brake disc 110 are received, may be provided to pass through an inside of the inductor 140 along the axial direction, and a wire 149 configured to receive an electrical signal, such as a current and an application voltage, may be electrically connected to the inductor 140. The receiving groove 145, which is recessed in the axial direction to allow at least one portion of the elastic member 130 to be inserted and received thereto, may be formed on the inward surface 140a (the left side with respect to FIG. 1) of the inductor 140.

In response to that an electrical signal, such as a current or voltage, is applied, the inductor 140 may generate an electromagnetic force and move the magnetic armature disc 120 backward (the right direction with respect to FIG. 1) so as to separate the armature disc 120 from the brake disc 110. In response to that the armature disc 120 is separated from the brake disc 110 by the operation of the inductor 140, the rotation of the drive shaft 10 coupled to the brake disc 110 may be allowed and thus the braking of vehicle may be released. On the other hand, in response to that the electrical signal, such as a current, applied to the inductor 140 is removed, the electromagnetic force applied to the armature disc 120 may be removed and the armature disc 120 may be moved forward (the left direction with respect to FIG. 1) by the elastic restoring force of the elastic member 130 and thus the armature disc 120 may be in close contact with the plate portion 115 of the brake disc 110, thereby braking the vehicle.

The spacer 150 may be interposed between the outward surface 1a of the drive motor 1 and the inward surface 140a of the inductor 140 to maintain a gap between the drive motor 1 and the inductor 140. Because the spacer 150 maintains the gap between the drive motor 1 and the inductor 140, a stroke region, in which the armature disc 120 is moved forward and backward, may be secured.

One end of the spacer 150 may be supported on the outward surface 1a of the drive motor 1, and the other end of the spacer 150 may be supported on the inward surface 140a of the inductor 140. The spacer 150 may be provided in such a way that a plurality of the spacers 150 is arranged at equal intervals to uniformly and stably maintain the gap between the drive motor 1 and the inductor 140. The spacer 150 may be provided to pass through the armature disc 120 as described above.

The spacer 150 may be mounted on the inductor 140 by the fastening member 160, and the fastening member 160 may be coupled to the inductor 140 by passing through the spacer 150 so as to stably support the spacer 150. The spacer 150 may be provided as bolts or the like, and although not shown in drawings, one portion of the fastening member 160 may be fixed and supported to the drive motor 1 so as to support the inductor 140 on the drive motor 1.

Hereinafter an operation of the electromagnetic brake system 100 according to the first embodiment of the disclosure will be described.

Figure 4:
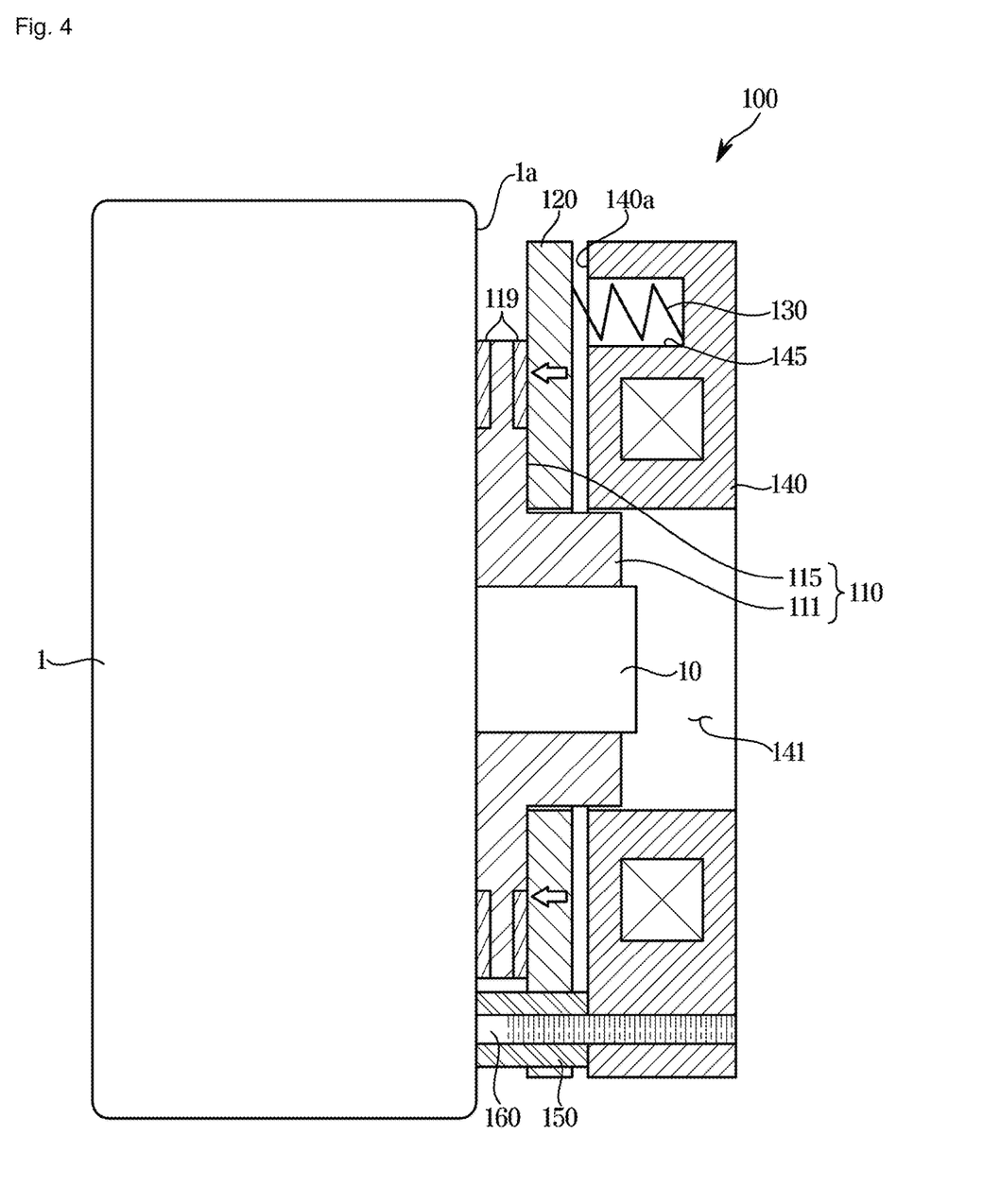
FIG. 4 is a longitudinal sectional view illustrating a state in which the electromagnetic brake system according to the first embodiment of the disclosure performs parking brake.

FIG. 4 is a longitudinal sectional view illustrating a state in which the electromagnetic brake system 100 according to the first embodiment of the disclosure performs the parking brake.

Referring to FIG. 4, in response to that an operation of the electric forklift is terminated and the vehicle is to be parked, the start or the power of the vehicle is turned off and thus the electric signal applied to the inductor 140 is removed. Accordingly, because the electromagnetic force generated by the inductor 140 is removed, only the elastic restoring force generated by the elastic member 130 may be applied to the armature disc 120 and thus the armature disc 120 may be moved forward (a left direction with respect to FIG. 4). The armature disc 120 may be moved forward so as to be in close contact with the plate portion 115 of the brake disc 110, and thus the rotation of the brake disc 110 may be limited by the frictional contact. The tube portion 111 of the brake disc 110 is fastened to the drive shaft 10 of the drive motor 1 and thus mutual rotational movements are constrained to each other. Accordingly, the rotation of the drive shaft 10 may be limited by the rotation restriction of the brake disc 110 and thus it is possible to perform the parking brake of the vehicle.

In this case, as the armature disc 120 is moved forward, the brake disc 110 may be also moved forward by a predetermined displacement, and thus the other side (a left side with respect to FIG. 4) of the brake disc 110 may be in close contact with the outward surface 1a (the right side with respect to FIG. 4) of the drive motor 1. Accordingly, as opposite sides of the brake disc 110 may be in frictional contact with the armature disc 120 and a housing of the drive motor 1, respectively, the rotation of the brake disc 110 may be further suppressed and the braking performance of the vehicle may be improved.

Hereinafter an operation of releasing the parking brake of the vehicle by the electromagnetic brake system 100 according to the first embodiment of the disclosure will be described.

Figure 5:
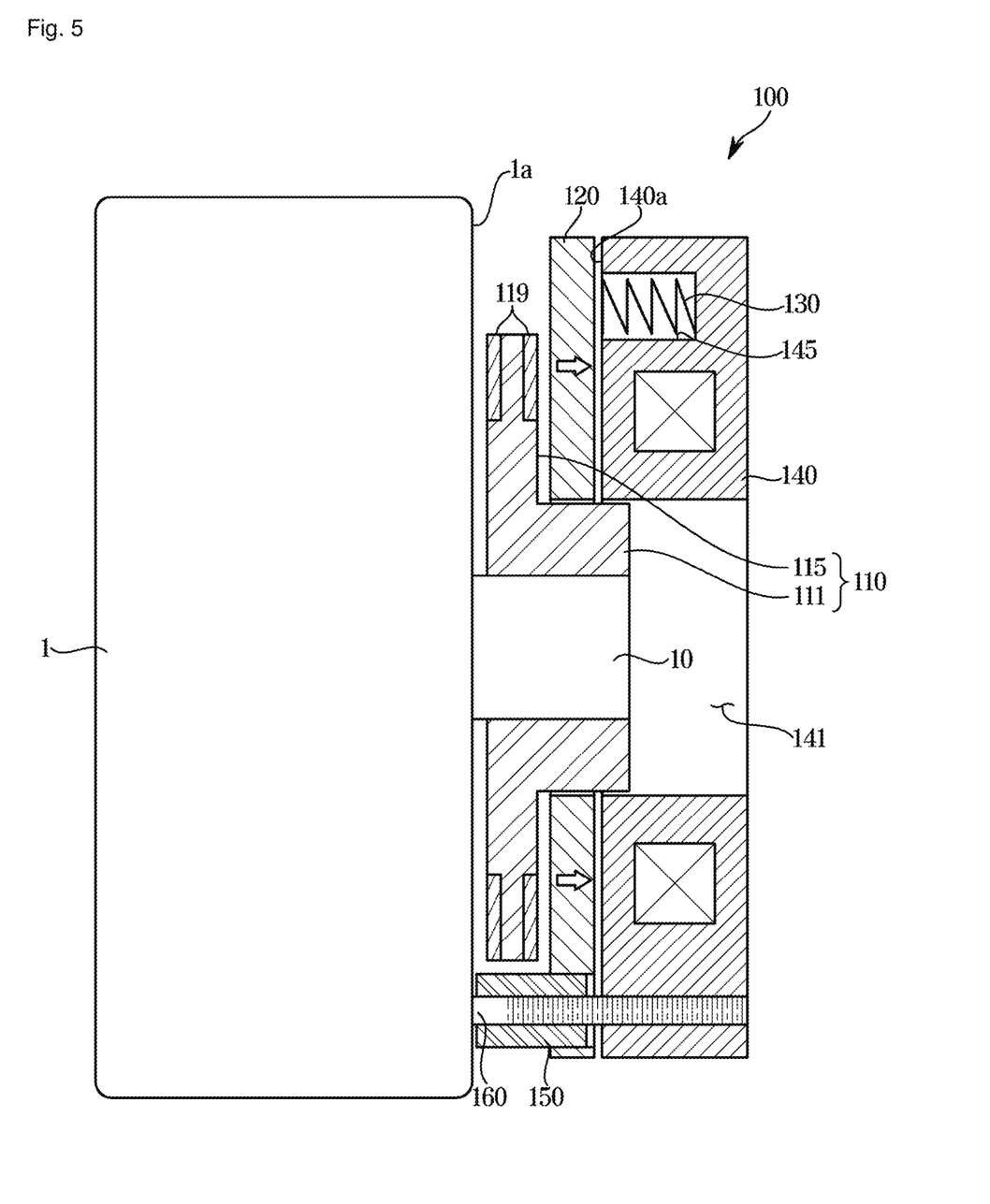
FIG. 5 is a longitudinal sectional view illustrating a state in which the electromagnetic brake system according to the first embodiment of the disclosure releases the parking brake.

FIG. 5 is a longitudinal sectional view illustrating a state in which the electromagnetic brake system 100 according to the first embodiment of the disclosure releases the parking brake.

Referring to FIG. 5, in response to that it is intended to release the parking brake of the vehicle for the operation of the electric forklift, the electrical signal, such as a current or a voltage, is applied to the inductor 140 through the wire 149. The inductor 140 receiving the electrical signal generates an electromagnetic force, and an attractive force is applied to the armature disc 120 by the electromagnetic force. In response to that the attractive force applied to the armature disc 120 is greater than the elastic restoring force of the elastic member 130, the armature disc 120 is moved backward (a right direction with respect to FIG. 5), and accordingly, the armature disc 120 is separated from the plate portion 115 of the brake disc 110. In response to that the brake disc 110 is separated from the armature disc 120, the brake disc 110 may not limit the rotation of the drive shaft 10 and thus the parking brake of the vehicle may be released.

Hereinafter an electromagnetic brake system 200 according to a second embodiment of the disclosure will be described.

Figure 6:
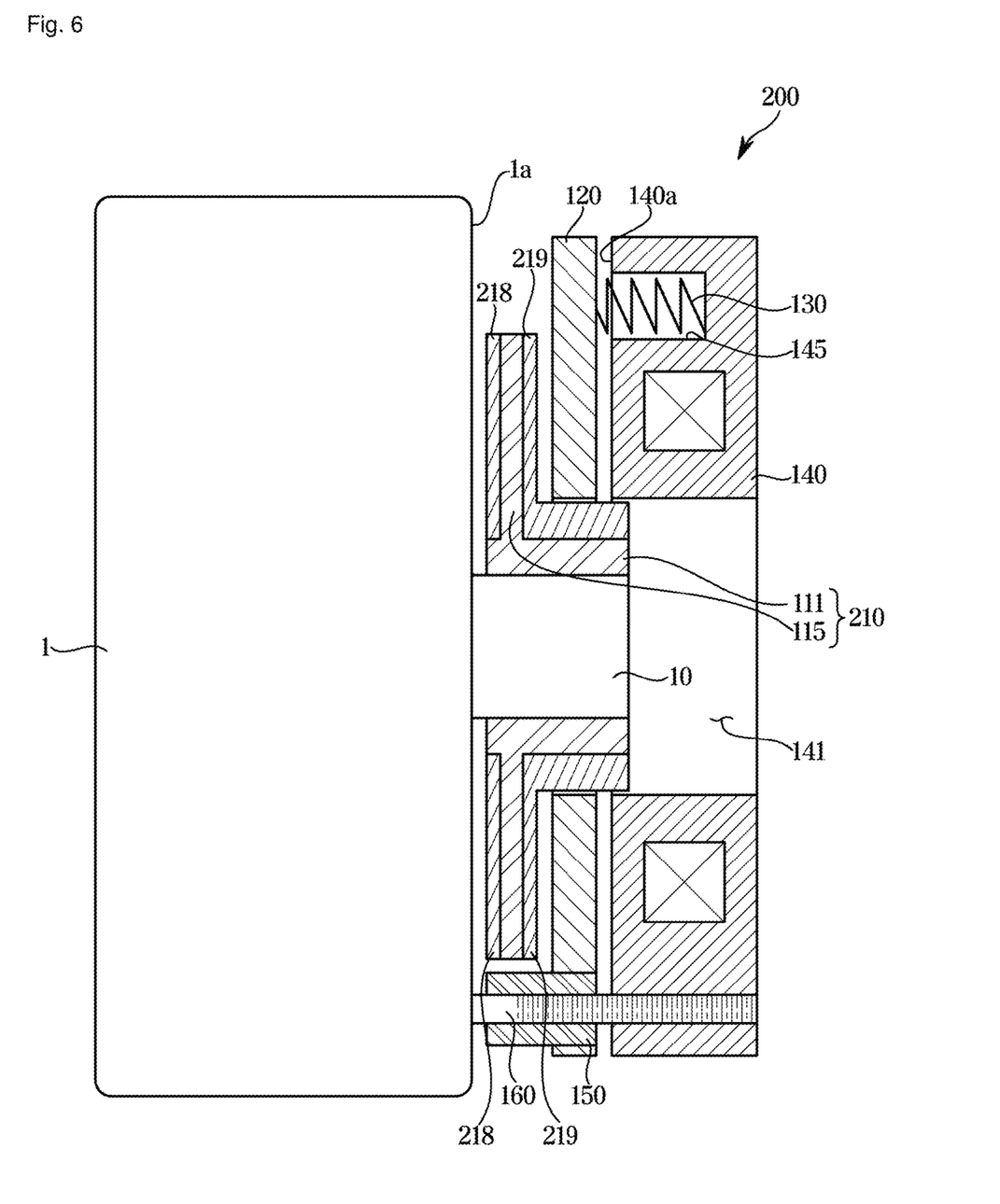
FIG. 6 is a longitudinal sectional view illustrating an electromagnetic brake system according to a second embodiment of the disclosure.

FIG. 6 is a longitudinal sectional view illustrating the electromagnetic brake system 200 according to the second embodiment of the disclosure, and a brake disc 210 according to the second embodiment of the disclosure includes a first lining 218 provided on the other side (a left side with respect to FIG. 6) of a plate portion 115, and a second lining 219 provided on one side (a right side with respect to FIG. 6) of the plate portion 115 and an outer circumferential surface of a tube portion 111.

In a description of the electromagnetic brake system 200 according to the second embodiment of the disclosure to be described below, except for additional description with separate reference numerals, a description the same as the description according to the electromagnetic brake system 100 according to the first embodiment of the disclosure will be omitted to prevent duplication of content.

In response to that an armature disc 120 is in close contact with the brake disc 210 by an elastic member 130 upon braking the vehicle, a predetermined displacement occurs in the brake disc 210 and the other side of the brake disc 210 (a left side with respect to FIG. 6) of the brake disc 210 may be in contact with an outward surface 1*a* (a right side with respect to FIG. 6) of the drive motor 1. In addition, as described above, opposite sides of the brake disc 210 may be intended to be in frictional contact with the armature disc 120 and a housing of the drive motor 1 to perform more stable braking. Accordingly, the first lining 218 is provided on the other side, which is opposite to the outward surface 1*a* (a right side with respect to FIG. 6) of the drive motor 1, of the plate portion 115 so as to reduce abrasion caused by the contact between the drive motor 1 and the brake disc 210. The first lining 218 may be formed of an elastic material, such as a rubber, provided to absorb shock, thereby suppressing noise and vibration generated when the drive motor 1 and the brake disc 210 come into contact with each other. The first lining 218 may be removably supported on the brake disc 210 to perform easy maintenance that is performed by a replacement when abrasion occurs due to a long time operation of the electromagnetic brake system.

The second lining 219 is provided on one side (a right side with respect to FIG. 6), which is opposite to the other side (a left side with respect to FIG. 6) of the armature disc 120, of the plate portion 115 and on an outer circumferential surface of the tube portion 111 opposite to an inner circumferential surface of the through-hole 121 of the armature disc 120. As the other side of the armature disc 120 is in contact with the one side of the plate portion 115 of the brake disc 210 by the elastic member 130 upon braking the vehicle, the second lining 219 may reduce the abrasion and prevent an operation noise and vibration caused by the contact between the armature disc 120 and the plate portion 115. Further, in response to that the armature disc 120 is moved forward and backward by the elastic member 130 and the inductor 140, respectively, the through-hole 121 of the armature disc 120 and the tube portion 111 may come into contact with each other. Because the second lining 219 extends to the outer circumferential surface of the tube portion 111, the second lining 219 may prevent abrasion, noise and vibration that may occur between the tube portion 111 of the brake disc 210 and the through-hole 121 of the armature disc 120. In the same manner as the first lining 218, the second lining 219 may be formed of an elastic material, such as a rubber, provided to absorb shock, and removably supported on the brake disc 210 to perform easy maintenance that is performed by a replacement.

Hereinafter an electromagnetic brake system 300 according to a third embodiment of the disclosure will be described.

Figure 7:
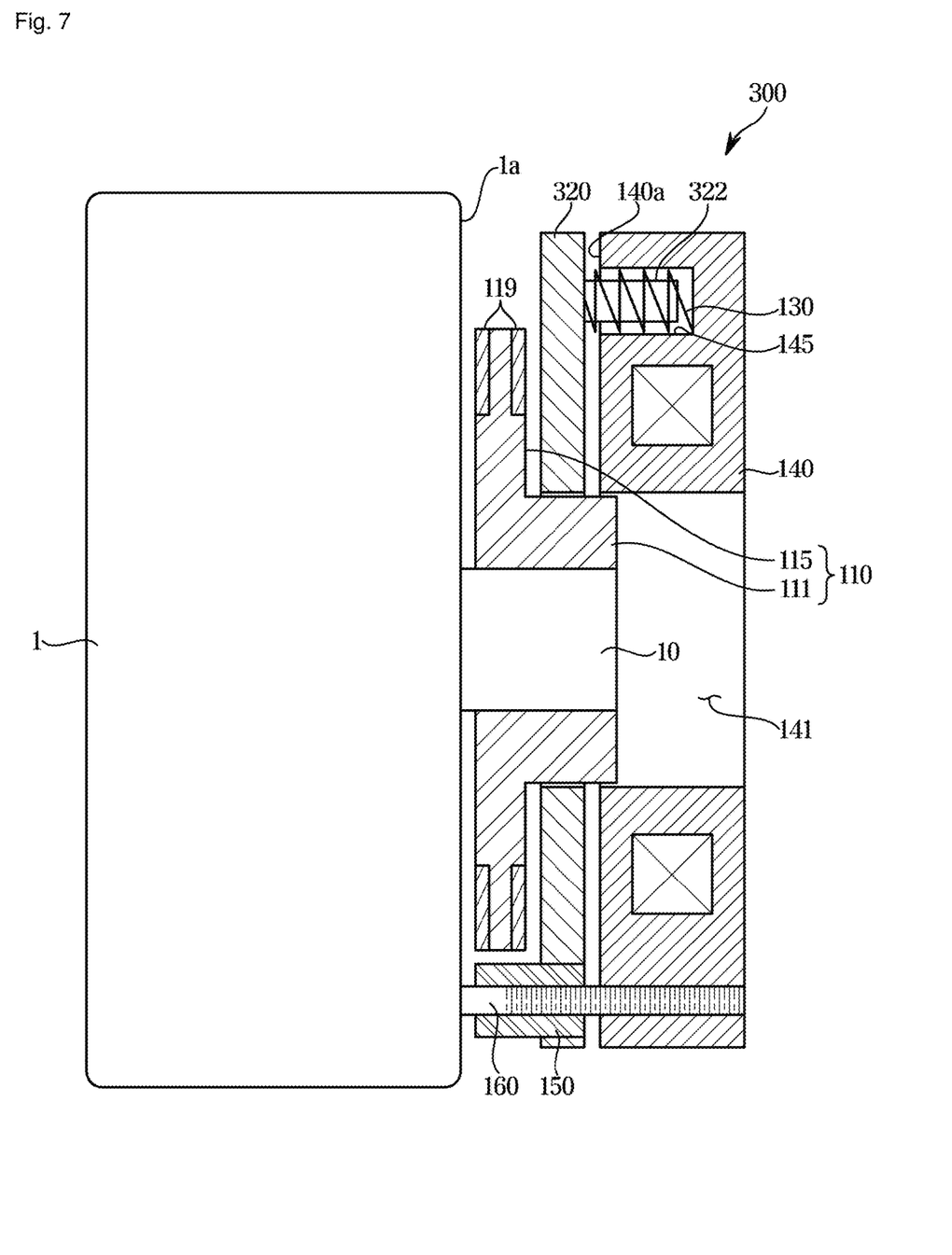
FIG. 7 is a longitudinal sectional view illustrating an electromagnetic brake system according to a third embodiment of the disclosure.

FIG. 7 is a longitudinal sectional view illustrating the electromagnetic brake system 300 according to the third embodiment of the disclosure, and an armature disc 320 according to the third embodiment of the disclosure includes a guide protrusion 322 provided to protrude along an axial direction to be insertable into a receiving groove 145 of an inductor 140.

In a description of the electromagnetic brake system 300 according to the third embodiment of the disclosure to be described below, except for additional description with separate reference numerals, a description the same as the description according to the electromagnetic brake system 100 according to the first embodiment of the disclosure will be omitted to prevent duplication of content.

The guide protrusion 322 may protrude from one side (a right side with respect to FIG. 7) of the armature disc 320 along the axial direction, and provided to be insertable into the receiving groove 145 of the inductor 140 provided on an inward surface 140*a* (a left side with respect to FIG. 7) of the inductor 140. In order to perform braking and releasing the braking of vehicle, the armature disc 320 performs forward and backward movement that is the armature disc 320 is moved forward (a left direction with respect to FIG. 7) by the elastic member 130 or the armature disc 320 is moved backward (a right direction with respect to FIG. 7) by an electromagnetic force of the inductor 140. Therefore, the guide protrusion 322 is formed on the one side of the armature disc 320, which is opposite to an inward surface 140*a* of the inductor 140, to protrude parallel to the axial direction, and the guide protrusion 322 is movable along the receiving groove 145 formed in the inductor 140. Accordingly, the guide protrusion 322 may guide stable forward and backward movement of the armature disc 320.

The guide protrusion 322 may be formed according to the number and position of the receiving grooves 145. Further, in a state in which the elastic member 130 is provided as a coil spring, an additional groove or recessed portion for inserting the guide protrusion 322 may be not required on the inductor 140 because the guide protrusion 322 is inserted in the elastic member 130, and thus it is possible to simplify the manufacturing process of the product.

As described above, the electromagnetic brake system according to the embodiment may improve the assembly and productivity of the product through the integration and simplification of the components, and because it is possible to prevent abrasion and separation between the components, the electromagnetic brake system may improve the durability of the product. In addition, because it is possible to suppress the noise or vibration between the components by the simplification of the components, the electromagnetic brake system may promote the operational reliability and marketability of the product.

As is apparent from the above description, the electromagnetic brake system may improve the assembly and productivity of the product with a simple structure.

The electromagnetic brake system may improve mountability and securing space utilization of a vehicle by reducing the number of components and the size of a product.

The electromagnetic brake system may improve the durability by preventing abrasion and separation between components by the simplified structure.

The electromagnetic brake system may improve the operational reliability by preventing noise and vibration between components by the simplified structure.

The electromagnetic brake system may reduce the manufacturing cost of a product by simplifying a structure.

The electromagnetic brake system may stably implement braking and releasing braking for various vehicles such as a forklift.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An electromagnetic brake system comprising:
a brake disc configured to be rotated together with a drive shaft of a drive motor configured to operate a vehicle wheel;
an armature disc configured to be movable so as to be in close contact with or so as to be separated from one side of the brake disc;
an elastic member configured to elastically press the armature disc to the one side of the brake disc to a direction in which the armature disc is in close contact with the brake disc; and
an inductor configured to separate the armature disc from the brake disc by an electrical signal,
wherein the brake disc comprises
a tube portion mounted on the drive shaft, and a plate portion provided to extend in an outward direction of the tube portion to be opposite to the armature disc;
wherein the tube portion and the plate portion are provided as a single member in which the tube portion and the plate portion are integrally formed with each other, and
wherein the brake disc comprises a first lining provided on the other side of the plate portion, and a second lining provided on one side of the plate portion and an outer circumferential surface of the tube portion.

2. The electromagnetic brake system of claim 1, wherein the other side of the brake disc is directly opposite to an outward surface of the drive motor.

3. The electromagnetic brake system of claim 2, further comprising:
a spacer provided to maintain a gap between the outward surface of the drive motor and an inward surface of the inductor.

4. The electromagnetic brake system of claim 3, wherein the spacer is interposed between the outward surface of the drive motor and the inward surface of the inductor and provided to pass through the armature disc.

5. The electromagnetic brake system of claim 4, wherein the spacer is provided in such a way that a plurality of spacers is arranged at equal intervals from each other.

6. The electromagnetic brake system of claim 3, further comprising:
a fastening member provided to mount the spacer to the inductor.

7. The electromagnetic brake system of claim 2, wherein the tube portion is provided in a hollow ring shape to allow the drive shaft to be seated therein,
wherein an outer circumferential surface of the drive shaft is spline-coupled to an inner circumferential surface of the tube portion.

8. The electromagnetic brake system of claim 2, wherein the inductor is provided with a receiving portion in which the drive shaft and the tube portion are received.

9. The electromagnetic brake system of claim 8, wherein the armature disc is provided with a through hole formed to pass through the armature disc in an axial direction to allow the drive shaft and the tube portion to be received therein.

10. The electromagnetic brake system of claim 9, wherein the armature disc is provided in the shape of a disc and configured to be movable in the axial direction along the outer circumferential surface of the tube portion.

11. The electromagnetic brake system claim 2, wherein
in response to that the armature disc is in close contact with the one side of the brake disc by the elastic member or in response to braking a vehicle, the other side of the brake disc is in close contact with the outward surface of the drive motor.

12. The electromagnetic brake system of claim 2, wherein a receiving groove in a concave shape is provided on the inward surface of the inductor,
wherein the elastic member is provided in such a way that at least one portion of the elastic member is inserted into the receiving groove.

13. The electromagnetic brake system of claim 12, wherein
the armature disc comprises a guide protrusion provided to protrude along the axial direction and insertable into the receiving groove.

* * * * *